United States Patent
Stoldt

[11] 3,901,341
[45] Aug. 26, 1975

[54] TRACTION MECHANISM

[75] Inventor: Erwin F. Stoldt, Farmington, N. Mex.

[73] Assignee: Bucyrus-Erie Company, South Milwaukee, Wis.

[22] Filed: July 9, 1973

[21] Appl. No.: 377,588

[52] U.S. Cl. ............................................. 180/8 D
[51] Int. Cl.² ........................................ B62D 57/02
[58] Field of Search ............ 180/8 R, 8 C, 8 D, 8 E; 74/569, 567

[56] References Cited
UNITED STATES PATENTS

| | | | |
|---|---|---|---|
| 1,571,206 | 2/1926 | Lautenschlager | 74/569 X |
| 1,666,709 | 4/1928 | Loud | 74/569 X |
| 2,132,184 | 10/1938 | Poche | 180/8 C |
| 2,247,782 | 7/1941 | Martinson et al. | 180/8 D |
| 3,185,139 | 5/1965 | Thuesen | 74/569 X |
| 3,265,145 | 8/1966 | Beitzel | 180/8 D |
| 3,331,463 | 7/1967 | Kramer | 180/8 R |

OTHER PUBLICATIONS
*Product Engineering*, "15 Ideas for Cam", F. Strasser, 8/7/1959, pg. 56.

Primary Examiner—Robert B. Reeves
Assistant Examiner—Charles A. Marmor
Attorney, Agent, or Firm—Quarles & Brady

[57] ABSTRACT

A walking dragline excavator has, for a propel system, a center base with movable feet on either side that are translated horizontally in the direction of travel, lowered to the ground and utilized to support the excavator which is then hoisted and translated to its next location over the feet and lowered again onto its base. The traction system for moving the feet and propelling the excavator includes a combination of a radial disc cam and crank on each side of the excavator that engage a pair of rollers and a slot respectively in a pedestal on each foot.

5 Claims, 8 Drawing Figures

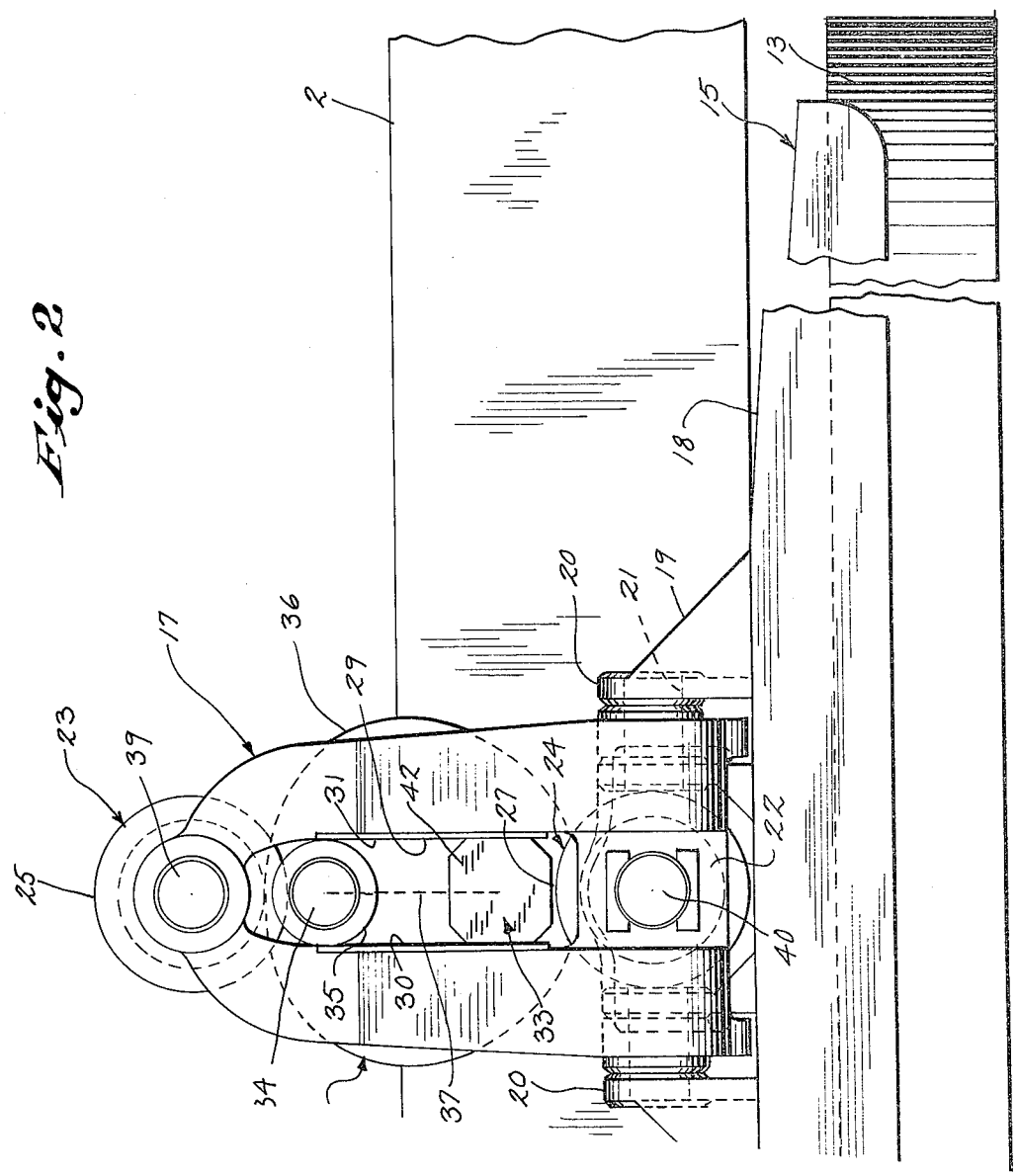

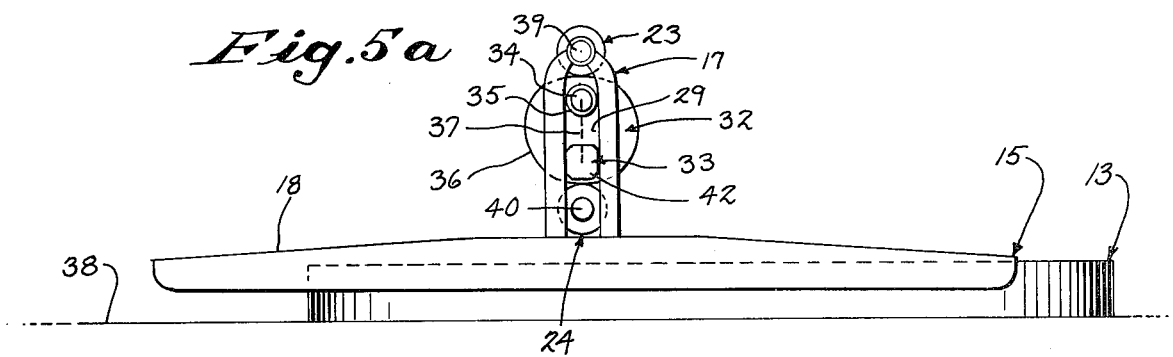
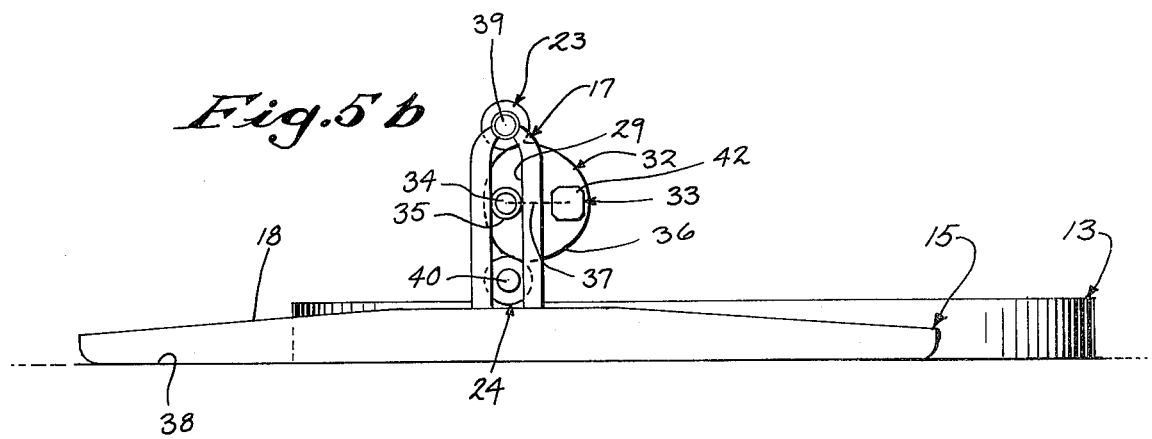
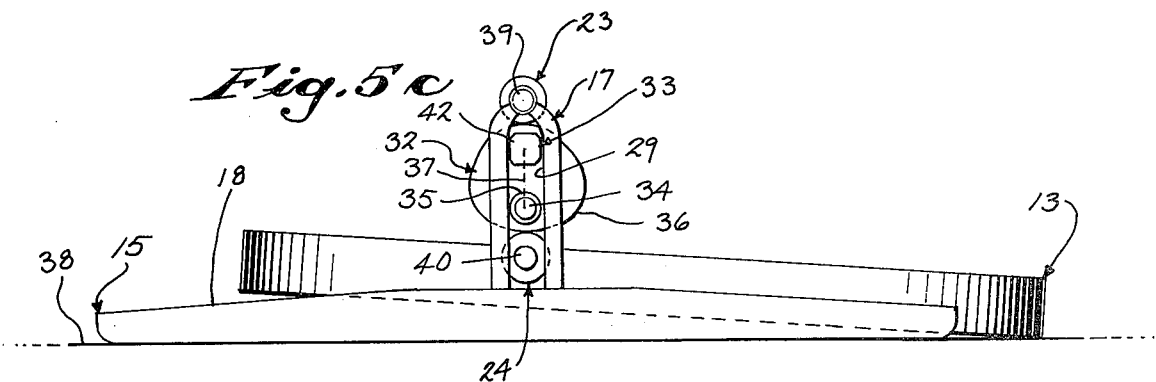
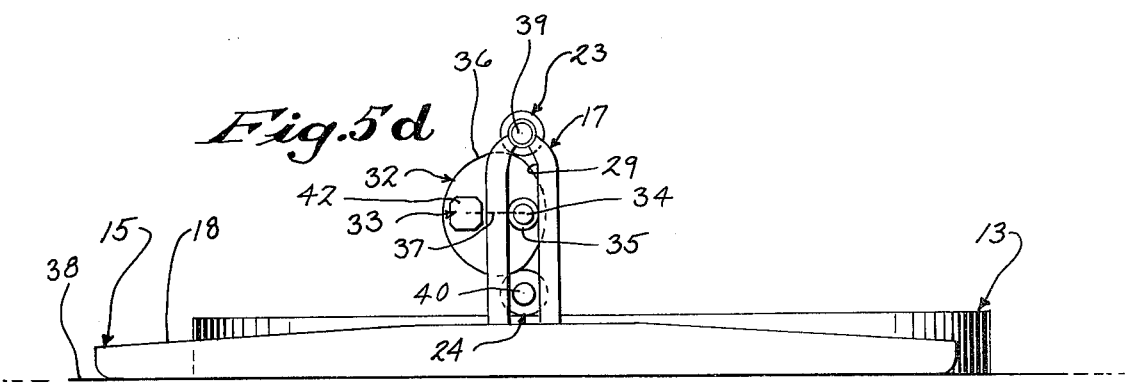

TRACTION MECHANISM

BACKGROUND OF THE INVENTION

Mobile equipment used in swampy or other soft terrain that will not support large pressures have for many years employed a walking propel system, instead of the more common wheeled or continuous track systems. Walking mechanisms are most commonly used on dragline excavators because these are large and heavy pieces of equipment that require some, but little mobility, and because they have the capacity to dig beneath the level on which they stand, so are most often used in swampy or other soft terrain. During normal digging operations, a walking dragline excavator has its weight distributed over a relatively large base. To propel the walking dragline, a pair of feet, having large bottom areas and being located on either side of the base, are lifted and translated a certain distance, called a step in the direction of propel and then are lowered to ground to provide a support so that the base can be raised off the ground and the excavator advance toward and over the feet and lowered to rest on the base, so the cycle can be repeated until the machine reaches the desired location.

Since the immensity of these machines is always a determinative factor in any design for a walking mechanism it is pertinent here to consider quantitatively what is involved. Among the numerous walking draglines appearing in the current Sales Manual of the assignee, the smallest weighs 203 tons and the largest 13,150 tons. The boom on the smallest walking dragline is 120 feet long and has its base 5½ feet from the ground, whereas the boom on the largest is 310 feet long and its foot is 24 feet from the ground. The revolving frame on the smallest walking dragline is 10 feet by 38 feet whereas in the largest it is 100 feet by 150 feet. The base on the smallest walking dragline is 24 feet in diameter and on the largest it is 105 feet in diameter. The shoes on the smallest walking dragline are 4 feet wide by 25 feet long, and on the largest they are 20 feet wide by 130 feet long. The smallest walking dragline has a 6 foot step and the largest has a step of 14 feet. The walking speed of the smallest walking dragline is approximately onefifth mile per hour, whereas the largest has a walking speed of approximately one-sixth mile per hour. Numerous models of the various different intermediate sizes exist each with a variety of options and boom lengths, etc. Designing structures and mechanisms on such a scale is an art of itself.

Almost all prior art mechanical walking traction systems have been crank operated and have differed primarily in the arrangement of linkages and configurations of cranks employed to achieve different results. One consistent exception to the crank operated traction mechanism in the prior art are the Martinson mechanisms shown in U.S. Pat. Nos. 1,591,764, 1,627,984, 2,247,781, 2,783,847, and, related to the Martinson patents, the Beitzel U.S. Pat. No. 3,265,145, all of which are owned by the common assignee who is also assignee of this invention, and from all of which this invention evolved. The Martinson mechanism employs an eccentric wheel operating between two tracks to impart vertical movement to the shoes and a crank mechanism to impart horizontal movement to the shoes. The Beitzel patent shows the use of an eccentric wheel rotating in a circular bearing to impart vertical motion with a crank and link mechanism to impart horizontal movement to the shoe. Both the Beitzel and Martinson structures involve in their operation sliding surfaces that are under heavy loading, with consequent energy dissipation and abrasive wear. Also, the sliding surfaces do not lend themselves readily to automatic lubrication and the entire mechanism is quite bulky.

SUMMARY OF THE INVENTION

The present invention relates to a traction mechanism for a mobile walking machine that employs a movable shoe for supporting the machine as it is propelled from one location to another which mechanism is characterized by the use of a positive motion non-circular cam with a follower for imparting at least one component of motion to the shoe relative to the machine.

This invention makes it possible to substitute rotating surfaces for sliding surfaces between the weight bearing, relatively moving engaging members of the traction system, and eliminating therewith all of the problems and limitations inherent in the existence of sliding surfaces. It also makes possible use of an automatic lubrication system for all moving parts to insure a minimum of frictional loss and maximum durability. Also, this mechanism is compact and is readily enclosed both to improve the safety factor of the traction system and to keep dirt out of the system. Furthermore, this mechanism opens the way to virtually limitless flexibility in designing paths of shoe movement to achieve the optimum horizontal and vertical components and angles of lift and descent for a specific terrain in which a machine is to operate.

BRIEF DESCRIPTION OF THE DRAWINGS

FIG. 2 is a partial side elevation of the excavator shown in FIG. 1 illustrating in detail the preferred embodiment of the traction mechanism of the present invention.

DESCRIPTION OF THE PREFERRED EMBODIMENT

Figures 1, 4:
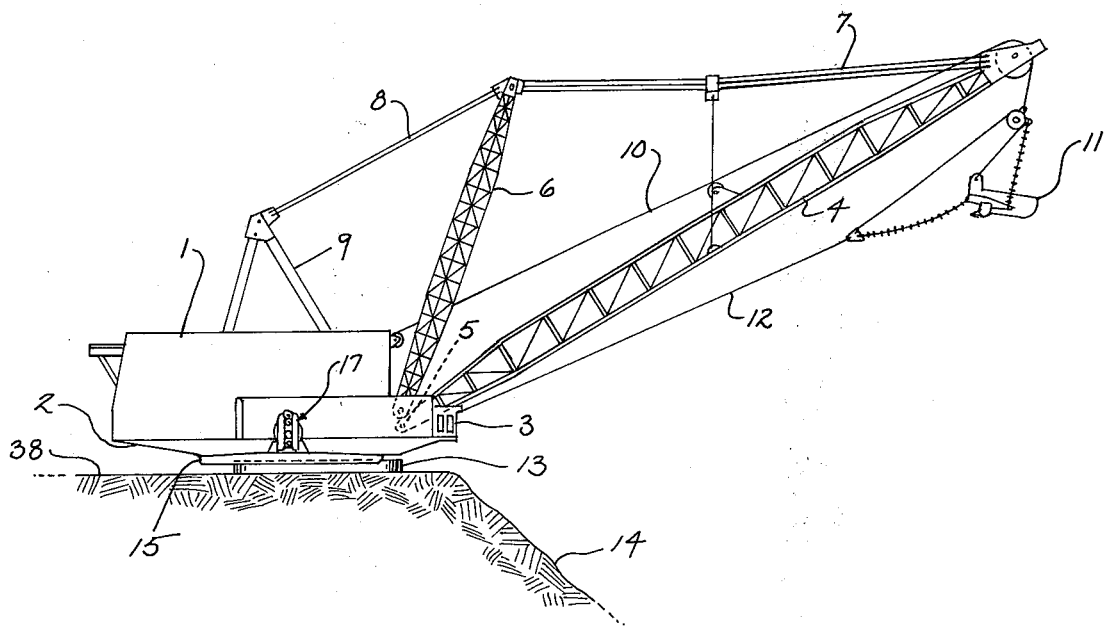
FIG. 1 is a side elevation of a walking dragline excavator utilizing a traction mechanism embodying a preferred form of the present invention.
FIG. 4 is a side elevation of the radial disc cam and crank of the traction mechanism shown in FIGS. 2 and 3, and FIGS. 5 a–d inclusive illustrate the operation of the preferred embodiment of the traction mechanism shown in FIGS. 1–4 in its various positions as the cam rotates in a counterclockwise direction showing (a) the shoe elevated, (b) the shoe lowered after being advanced, (c) the base elevated and (d) the base lowered after being advanced.

A description of the machine itself, in this case a walking dragline excavator, while not specifically a part of the invention may nevertheless help in visualizing the operation of the invention. The dragline excavator in FIG. 1 has a housing 1 supported on a revolving frame 2 to enclose all of the motors, cable drums and control mechanisms, which are not disclosed here. At the front of the housing is an operator's cab 3, and a boom 4 which projects upwardly from its foot 5 and is mounted on the front of the revolving frame 2. A stiff leg 6 projects upwardly from the front of the revolving frame 2 and is connected at its top by boom suppport cables 8 which extend respectively to the top of the boom 4 and to an A-frame 9 which straddles the center of the revolving frame 2. A bucket hoist cable 10 extends from the front of the housing 1 over the top of the boom 4 to a bucket 11 and a dragline 12 extends from the housing 1 to the bucket 11 beneath the boom. The generally horizontal revolving frame 2 is then rotated by a swing circle (not shown) and supported by a circular base 13, which rests upon supporting terrain 38 while the dragline excavator is digging.

In operation of the excavator, the bucket 11 is lowered from the tip of the boom 4 onto the terrain 38 to be excavated and drawn back toward the excavator by the dragline 12 creating by continued digging a hole in front of the excavator with a bank 14 sloping up toward the front of the excavator. When by continued digging the bank 14 recedes as close as possible to the excavator, the excavator advances rearwardly to a new location from which it resumes digging in the bank 14 toward itself. The traction mechanism for propelling the dragline to its successively new positions away from the bank 14 is the subject of the present invention.

On each side of the base 13 are shoes 15 and 16. The shoes 15 and 16 in appearance and function resemble pontoons more closely than shoes, for they are shaped like barges and provide with sufficient bottom area to float the machine on soft terrain while the machine is being advanced to a different position. Because the weight of the upper works, that is the boom 4, stiff leg 6 and bucket 11 are over or projected beyond the front of the machine, the location of the cam shaft is selected so that the machine is front heavy notwithstanding the usual counterweight provided in the rear in the revolving frame 2. Hence, when the shoes 15 and 16 are lowered to the surface of the ground and the machine is elevated to be advanced, the rear of the base 13 is lifted off the ground but the front of the base 13 usually is dragged along the ground. Since the shoes 15 and 16 are identical and the mechanisms used to transpose the shoes 15 and 16 are either identical or have mirror image identity so as to move the shoes 15 and 16 simultaneously, it is necessary to describe only one shoe 15 of the shoes 15 and 16, since that description will apply equally well to the other shoe 16.

An L-shaped vertical follower and slot frame 17 is hinge mounted to a top surface 18 of the shoe 15 by means of a pair of hinge brackets 19 which are welded to the top of the shoe 15, and which support a pair of horizontal journals 20 that straddle an aligned journal 22 in the bottom of the L-shaped follower and slot frame, so that a hinge pin 21 can be inserted through the journals 20 and 22. This hinge mounting of the shoe 15 allows the shoe 15 to adapt to irregularities in the terrain, and in its conception, if not its structure, is conventional in the art.

The L-shaped follower and slot frame 17 is, however, novel in most all other aspects of its structure. In its upper and lower ends the L-shaped follower and slot frame 17 has rollers 23 and 24, respectively, rotatably mounted on horizontal shafts, 39 and 40, respectively, and the follower rollers 23 and 24 have radially projecting flanges 25, 26 27 and 28 respectively on their ends. Extending vertically up the center of the follower and slot frame 17 is a vertical slot 29 fitted with bearing surfaces 30 and 31 on its vertical sides.

A radial disc cam 32 is mounted on a squared end of a walking shaft 33, the remainder of which is not shown, but which is supported and rotatably driven by machinery within the housing 1 of the excavator so that the shaft 33 and radial disc cam 32 are rotatably mounted in a fixed position relative to the revolving frame 2 of the excavator, and hence are fixed vertically with respect to the base 13. The radial disc cam 32 in the preferred embodiment serves a dual purpose, first as a radial disc cam 32 trapped between the roller followers 23 and 24, and, secondly, as the crank arm 37 for a crank pin 34 which projects axially from its outer surface and which has a roller 35 rotatably mounted on its outer end to be trapped within the vertical slot 29 in the follower and slot frame 17. The cam radius 37 from the walking shaft 33 to the crank pin 34 serves as a crank arm 37 providing with the roller 35 and slot 29, a crank and slot drive to impart horizontal motion to the shoe 15. The radial disc cam 32 having an external cam surface 36 against which the roller followers 23 bear serves to impart a vertical component to the motion of the shoe 15 relative to the base.

Figure 3:
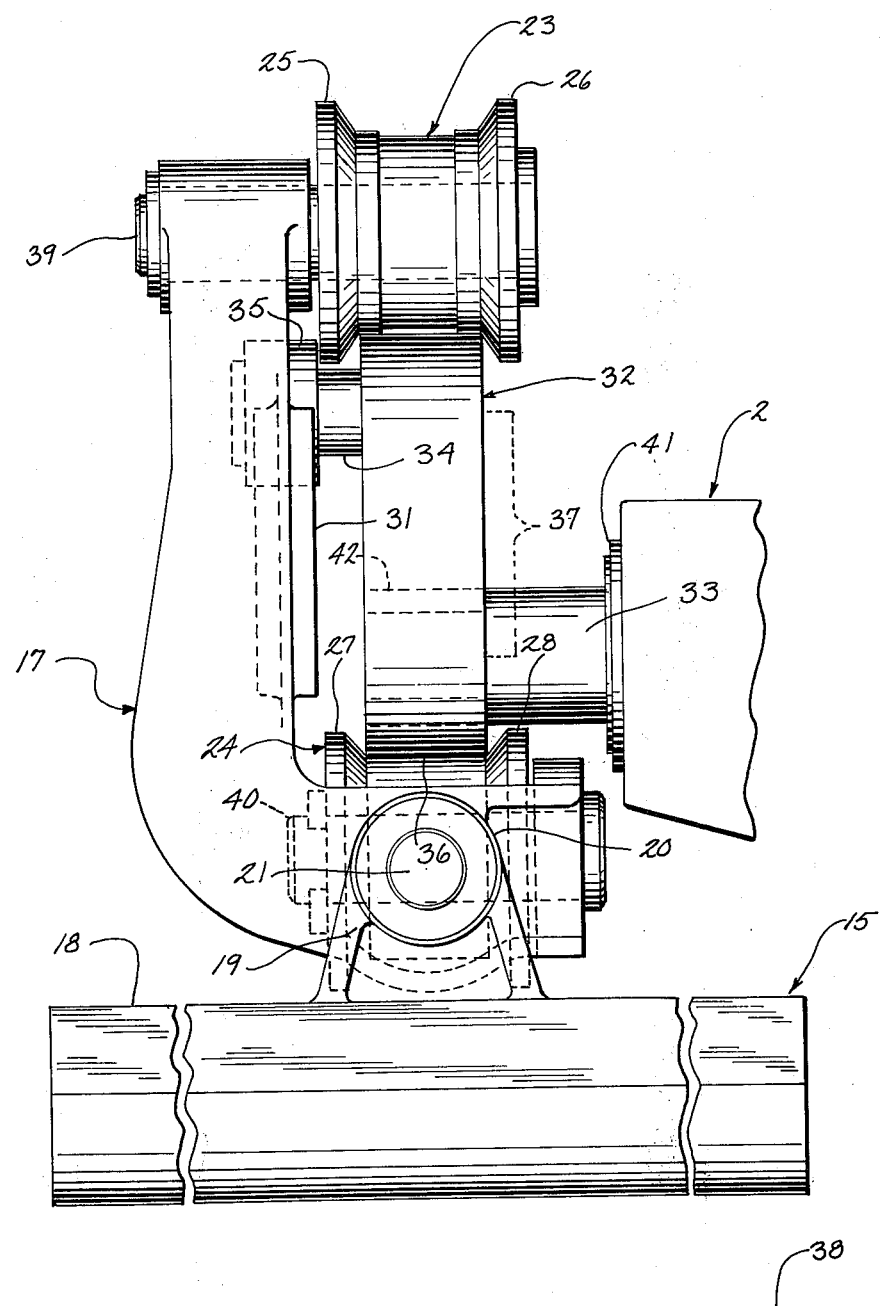
FIG. 3 is a front elevation of traction mechanism shown in FIG. 2.

Portions of the structure of the preferred embodiment of the novel traction mechanism can best be seen in front elevation as is shown in FIG. 3. The L-shaped configuration of the follower and slot frame 17 is clearly apparent, as are the flanges 27 and 28 on the roller followers 23 and 24 respectively. The roller followers 23 and 24 are respectively rotatably mounted on shafts 39 and 40 in the top and bottom of the follower and slot frame 17. The flanges 27 and 28 can be seen to capture the radial disc cam 32 so that the radial disc cam 32 can hold a follower and slot frame 17 and thus the shoe 15 from falling away from the machine. The rotary disc cam 32 is clearly shown as mounted on a squared end 42 of the walking shaft 33 which in turn projects from a journal 41 in the revolving frame 2. To aid in visualizing the structure represented in FIG. 3, it may help to mention that, in the smallest walking dragline excavator referred to above, the walking shaft is approximately nine inches in diameter and in the middle of the size range it is approximately one and one-half feet in diameter.

When the radial disc cam 32 and the crank 27 are rotated by the walking shaft 33, the crank pin 34 and roller 35 perforce describe a circular motion about the walking shaft 33, but the vertical component of that circular motion is lost to the shoe 15 in the vertical slot 29, leaving only a horizontal oscillatory motion of the shoe 15 relative to the base 13. By contrast, as the cam surface 36 of the radial disc cam 32, which in the drawings has a modified heart shape, is rotated its entire motion is used by the follower rollers 23 and 24 and translated to the shoe 15 by the vertical follower and slot frame 17. As the shoe 15 is being lifted by the cam surface 36 of the radial disc cam 32 the weight of the shoe 15 is borne by the top roller follower 23, and when the base 13 is being lifted with the shoe 15 on the ground, the weight of the entire machine is borne by the lower roller follower 24. The motion of both the shoe 15 and the base 13, and thus of the radial disc cam 32 and the follower rollers 23 and 24 together with the crank pin 34 and the slot 29 are equally discontinuous with respect to the ground, but the motion of the shoe 15 with its follower and slot frame 17 as compared to the base 13 and the cam 32 and crank pin 34 is continuous. The reason for this is that when the shoe 15 is being raised and lowered out of contact with the ground, the shoe 15 moves relative to the ground while the base 13 remains stationary relative to the ground, but as soon as the shoe 15 engages the ground as the radial disc cam 32 continues to rotate, then the shoe 15 stops moving relative to the ground and the base 13 is lifted and translated horizontally until it is once again lowered to the ground.

The operation of the traction mechanism of the present invention is illustrated in the schematic drawings in FIGS. 5a through 5d, which figures illustrate the shoe 15 and the base 13 together with a representation of the follower and slot frame 17, the followers 23 and 24, the radial disc cam 32 with the crank pin 34, the roller 35 and the walking shaft 33. In FIG. 5a, the excavator would be in a digging position with the front of the excavator toward the right, and the base 13 supporting the machine stands on the ground 38 while the shoe 15 is elevated to its highest position. To withdraw the machine from the edge of the bank 14, the walking shaft 33 is rotated counterclockwise, rotating the radial disc cam 32 so that the top roller follower 23, which is supporting the shoe 15 on the radial disc cam 32, lowers the shoe 15 to the ground 38. As the walking shaft 33 continues to rotate the radial disc cam 32, the cam surface 36, now bearing against the lower roller follower 24, lifts the base 13 of the machine, but due to the imbalance of the machine caused by the outreaching boom and upper works, the rear end of the base 13 only is lifted off the ground and a front remains on the ground. Finally with the continued rotation of the walking shaft 33 and the radial disc cam 32, the base 13 is lowered once again to its normal position. From this latter normal position, the continued rotation of the walking shaft 33 and radial disc cam 32 would hoist the shoe 15 to the position shown in FIG. 5a.

While the cam surface 36 of the radial disc cam 32 was thus lowered the shoe 15 and raising the base 13, and then lowering the base 13 in FIGS. 5a to 5d, the crank and slot drive was also functioning to effect, at appropriate points, a horizontal motion of these members. In FIG. 5a, as the walking shaft 33 rotates driving the crank 37 and the crank pin 34 and roller 35 counterclockwise, the shoe 15 is advanced to the rear as it is lowered until it rests upon the ground 38 as shown in FIG. 5b. As the walking shaft 33 continues to rotate the crank 37 toward the position as shown in FIG. 5c, the rear of the base 13 is simultaneously lifted and advanced to the rear in the same direction as the shoe 15 had been advanced by the crank pin 34 with its roller 35 operating in the slot 29. When the base 13 is lowered to its next position, as shown in FIG. 5d, the crank 37 through the roller 35 on the crank pin 34 has advanced the base 13 to its rearmost position relative to the shoe 15.

The above described operating cycle of this traction mechanism imparts an elliptical motion to the shoe 15 relative to the base 13 and the rest of the machine. Since the crank-in-slot drive, which is made up of the crank 37 with its roller 35 in the slot 29 of the follower and slot frame 17, imparts only a horizontal component to the relative motion of the shoes 15 and 16 the vertical component and the shape of the path of relative motion of the shoes 15 and 16 are governed by the shape of the cam surface 36. This use of a cam, such as the cam surface 36, gives the design engineer practically limitless flexibility in selecting the optimum path of relative motion of the shoes 15 and 16 to the base 13. The ratio of the vertical component or lift to the horizontal translation of the shoe 15 can be easily manipulated and the ascent and descent of the shoes 15 and 16 and of the base 13 can by any desired angle from gradual or abrupt or even complex varying curves by simply changing the shape of the cam surface 36.

In the preferred embodiment, a crank and slot drive is employed for the horizontal component of movement and a positive motion cam is employed for the vertical, but clearly these functions could be reversed if desired, using a cam for the vertical motion and a crank for the horizontal. It has been mentioned that the cam drive is the positive motion drive and in the preferred embodiment this is effected by utilizing a radial disc cam with upper and lower rollers followers 23 and 24, but a single follower could be used by trapping it in a rotating channel. These alternatives point to the truth that the invention disclosed is not confined to the preferred embodiment, which is described in detail above, but rather the invention is set forth in the claims that follow.

I claim:

1. In a walking mechanism for a mobile machine, such as an excavator, having:
   i. a base for stationary support of the machine;
   ii. a shoe for supporting said machine when said base is lifted and horizontally translated to transport said machine from one location to another; and
   iii. a rotary walking shaft extending from said base for lifting and horizontally translating said base and said shoe relative to one another through a cycle of motion having both vertical and horizontal components;

the improvement therein comprising:
   a. a rotary cam on said walking shaft for rotation therewith that has a non-circular cam surface which is orbited about said walking shaft;
   b. a frame on said shoe with a lengthwise slot;
   c. a crank pin rotated with said rotary cam about said walking shaft with the distance between the crank pin and walking shaft centers forming a crank arm, said crank pin engaging said slot for imparting one of said components of motion upon rotation of said walking shaft; and
   d. follower roller means carried by said shoe to engage said rotary cam and impart said other of said components of motion upon rotation of said walking shaft.

2. A walking mechanism as in claim 1 in which said follower roller means comprises a pair of rollers located at circumferentially spaced points along said rotary cam, one of said rollers bearing a load for shoe movement during a portion of said cycle of motion, and said other roller bearing a load for base movement during another portion of said cycle of motion.

3. A walking mechanism as in claim 1 in which said slot of said frame is substantially vertical.

4. A walking mechanism as in claim 3 in which said follower roller means comprises a pair of rollers located at circumferentially spaced points along said rotary cam, with one roller located above said slot and the other roller located beneath said slot; and said walking shaft, said crank pin, and said rollers are in alignment with one another upon maximum vertical displacement of said base and shoe.

5. A walking mechanism as in claim 3 in which said follower roller means comprises a pair of rollers located in circumferentially spaced points along said rotary cam, with one of said rollers being below a portion of said rotary cam to sustain the load of said base during a part of the cycle of motion when said base is raised and the other roller being above a portion of said rotary cam to sustain the load of said shoe during another part of the cycle of motion when said shoe is raised.

* * * * *